United States Patent
Hoult

[15] 3,706,416
[45] Dec. 19, 1972

[54] APPARATUS FOR RINSING SMALL PARTICULATE MATERIAL

[72] Inventor: Raymond Oliver Hoult, Burton upon Trent, Straffordshire, England

[73] Assignee: Coal Industry (Patents) Limited, London, England

[22] Filed: Feb. 23, 1971

[21] Appl. No.: 118,038

[30] Foreign Application Priority Data

March 3, 1970 Great Britain.....................10,126/70

[52] U.S. Cl..............................239/193, 239/553.5
[51] Int. Cl. ...................................................B05b 1/36
[58] Field of Search........239/553, 553.3, 553.5, 193, 239/194

[56] References Cited

UNITED STATES PATENTS 3,158,171  11/1964  Eckert.............................239/193 X
1,593,252  7/1926   Fluor...................................239/193
3,147,212  9/1964   Koppen et al. .........................239/193
3,420,443  1/1969   Koppen et al. .........................239/193
3,491,792  1/1970   Eckert...................................239/193
3,580,008  5/1971   Barnard et al.....................239/553.5

*Primary Examiner*—Lloyd L. King
*Attorney*—Stevens, Davis, Miller & Mosher

[57] ABSTRACT

Apparatus for producing small slow moving water droplets for rinsing small particulate material so as to remove fine particulate material adhering to the small material. The apparatus including an upper portion comprising a feed pipe and a baffle plate, and a lower portion comprising a plurality of layer of angle bar sections, the sections in each layer being parallel to each other and arranged transverse to the sections in an adjacent layer.

8 Claims, 3 Drawing Figures

PATENTED DEC 19 1972　　　　　　　　　　　　　　　　　3,706,416

APPARATUS FOR RINSING SMALL PARTICULATE MATERIAL

The present invention relates to apparatus for rinsing small particulate material so as to remove fine particulate material adhering to the small material.

In particular, although not exclusively, the invention relates to apparatus for use in a dense medium coal preparation plant where it is required to rinse small coal or rock material after its passage through the plant in order to remove the recover the dense medium material.

Generally, a bed of small coal or rock material is rinsed with water while it is passed over a screen, the dense medium being washed through the screen by the water. As the coal or rock material is small the water must be in the form of slow flowing droplets, the force of which is insufficient to disturb the coal or rock material and cause gaps in the bed of material which would allow the water to flow through the screen without contacting material.

Unfortunately, the water usually contains foreign solid material and with known apparatus which comprises passing the water through small apertures, the apertures quickly become blocked and require frequent cleaning.

One known apparatus comprises an upper portion including a water inlet pipe and a tray in the bottom of which is formed a plurality of relatively small holes of about ⅜inch diameter, and a lower portion including a horizontal corrugated sheet positioned beneath the upper portion. In operation of this known apparatus water is fed onto the tray from where it passes through the small holes as a series of relatively large, quickly moving droplets which impinge on the corrugated sheet and form relatively small slow moving droplets which are then allowed to fall onto the material passing over the screen. It has been found that with such apparatus the relatively small holes become blocked very rapidly by the foreign solid material in the water feed and require cleaning several times a day. If, as usually is the case, the holes are not cleaned regularly the water spills over the sides of the tray and the ultimate droplets produced by the apparatus are sufficiently large and rapidly moving to disturb the bed of material and consequently fine material is washed through the screen with the dense medium which is thus contaminated.

An object of the present invention is to provide improved apparatus for rinsing small particulate material which dispenses with the necessity of passing the water through small apertures and thereby overcomes the above mentioned disadvantage.

According to the invention apparatus for rinsing small particulate material includes an upper portion and a lower portion beneath the upper portion, the upper portion comprising at least one inlet for fluid and a baffle plate beneath the inlet, and the lower portion comprising a plurality of layers of angle bar sections, the sections in each layer having their apices uppermost, being parallel with each other, and being arranged transverse to the sections in an adjacent layer.

Preferably, the sections in alternate layers are arranged parallel to each other and the apices of the sections in one layer are arranged midway between the apices of the sections in the next layer of parallel sections.

Advantageously, the apparatus comprises a wall around the sections and four layers of sections.

By the way of example only, two embodiments of the invention will be described with reference to the drawings accompanying the Provisional Specification in which.

Figure 1:
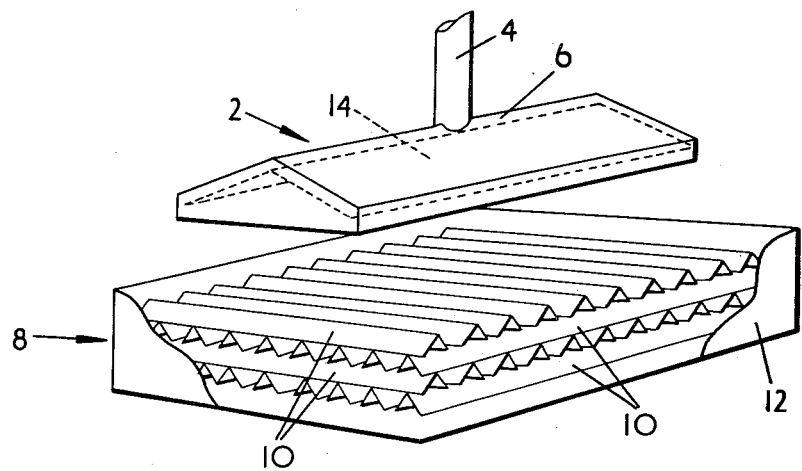
FIG. 1 is a diagrammatic perspective view of apparatus for rinsing small particulate material, constructed in accordance with the invention, an outer part of the apparatus has been cut-away.

FIG. 1 shows apparatus for rinsing small particulate material to include an upper portion 2 comprising a water inlet pipe 4 and a hood 6, and a lower portion 8 comprising four layers of angle bar sections 10. The sections 10 in each layer are spaced from one another and have their apices uppermost. The sections 10 in each layer are parallel to each other and are arranged transverse to the sections in an adjacent layer. The sections 10 in alternate layers are arranged parallel to each other and the apices of the sections 10 in one layer are arranged mid-way between the apices of the sections 10 in the next layer of parallel sections so that the apices of the sections in one layer are arranged directly beneath the gaps formed between adjacent sections in the next layer of parallel sections.

A vertical wall 12 is positioned around the sections 10 and in operation prevents water spilling over the ends of the sections 10.

Within the hood 6 directly beneath the inlet pipe 4 is a bent baffle plate 14 having a cross-section substantially "V" shaped, the apex of the "V" being uppermost. The baffle plate 14 is secured to the hood 6 by end brackets (not shown). For larger capacity apparatus there may be more than one inlet pipe.

In operation, the spraying apparatus is positioned directly above a screen (not shown) along which passes a bed of coal or rock material from a dense medium coal preparation plant. The coal or rock material is, for example, less than 30 mm in particle size. The width of the apparatus is substantially the same as the width of the screen.

As the material passes along the screen, water is fed through the inlet pipe 4 and impinges on the baffle plate 14 so as to flow in all directions over the plate 14 and be evenly distributed.

The water then falls in the form of a curtain from each edge of the plate 14 onto the uppermost layer of the sections 10 from where it falls sequentially onto the other layers. The water runs down the side of each section and falls through the gaps between adjacent sections so forming smaller and slower moving droplets. Thus at each layer the water is formed into more and more, smaller and smaller droplets until the droplets falling from the lowermost layer of sections 10 are of such a small size and fall with such a low velocity that their force is sufficient to remove the dense medium material without disturbing the fine coal or rock particles.

The water falling through the screen is collected and treated before being re-used in the dense medium plant.

In the apparatus shown each layer of sections 10 covers an area of 48 by 13 inches and the apices of the sections are arranged at 2 inch intervals. The apparatus was developed to work with water flows of 40 to 50 gallons per minute and the diameter of the inlet pipe is 2 inches.

In modifications of the apparatus all exposed parts may be given a protective coating of, for example, pitch epoxy paint or nylon. The number of layers of angle bar sections may be changed to two or three or more than four in order to vary the size and speed of the droplets produced by the apparatus.

Figure 2:
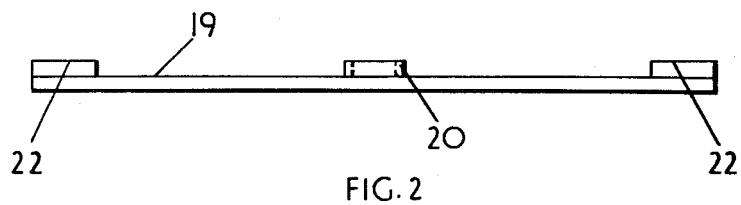
FIG. 2 is a diagrammatic side view of a part of a second embodiment of the invention.
Figure 3:
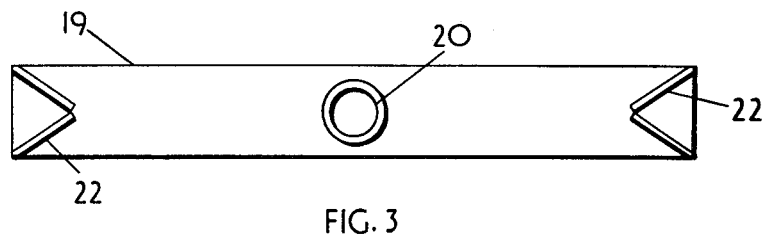
FIG. 3 is a plan of the part shown in FIG. 2.

FIG. 2 and 3 show a second embodiment of baffle plate 19 which is generally flat and has upwardly extending guides 20, 22 for the water from the inlet pipe. The central circular guide 20 which is located directly beneath the inlet pipe and within which the water impinges, ensures that the water is evenly distributed over the baffle plate 19. The baffle plate 19 is secured to the hood by brackets (not shown).

The two "V" shaped guides 22 ensure that the water flows from the sides of the baffle plate which in operation are arranged across the screen, and not from the ends of the baffle plate.

In further modification of the invention, the baffle plate is provided with at least one upwardly extending guide for the fluid and may have a cross-section substantially "V"-shaped.

For screens having a large surface area two or more sets of apparatus may be connected together.

I claim:

1. Apparatus for rinsing small particulate material, including an upper portion and a lower portion beneath the upper portion, the said upper portion comprising fluid inlet means and a baffle plate located beneath the said fluid inlet means, and the said lower portion comprising a plurality of layers of angle bar sections, the sections in each layer having their apices uppermost, being parallel with each other, and being arranged transverse to the sections in an adjacent layer.

2. Apparatus as claimed in claim 1, in which the sections in each layer are spaced from one another and the sections of alternate layers are arranged parallel with each other and the apices of the sections in one layer are arranged midway between the apices of the sections in the next layer of parallel sections.

3. Apparatus for rinsing small particulate material, including an upper portion, a lower portion beneath the upper portion, the said upper portion comprising fluid inlet means and a baffle plate located beneath the said fluid inlet means, and the said lower portion comprising a plurality of layers of angle bar sections, the sections in each layer having their apices uppermost, being parallel with each other, being spaced from one another, and being arranged transverse to the sections in an adjacent layer, and the sections in alternate layers being arranged parallel with each other and the apices of the sections in one layer being arranged midway between the apices of the sections in the next layer of parallel sections, and including a wall arranged around the said section.

4. Apparatus as claimed in claim 3, in which the baffle plate is substantially "V"-shaped in cross-section, the apex of the "V" being arranged uppermost.

5. Apparatus for rinsing small particulate material, including an upper portion, a lower portion positioned beneath the upper portion, the said upper portion comprising fluid inlet means and a baffle plate having upwardly extending guides for fluid located beneath the said fluid inlet means, and the said lower portion comprising a plurality of layers of angle bar sections, the sections in each layer having their apices uppermost, being parallel with each other, being spaced from one another, and being arranged transverse to the sections in an adjacent layer, and the sections in alternate layers being arranged parallel with each other and the apices of the sections in one layer being arranged mid-way between the apices of the sections in the next layer of parallel sections, and including a wall arranged around the said sections.

6. Apparatus as claimed in claim 5, comprising a central circular upwardly extending guide for fluid.

7. Apparatus as claimed in claim 5, comprising two "V"-shaped upwardly extending guides for the fluid.

8. Apparatus as claimed in claim 5, comprising a central circular upwardly extending guide and two "V"-shaped upwardly extending guides for the fluid.

* * * * *